May 19, 1970  D. S. MILEWSKI ET AL  3,512,842
METHOD OF SLURRY UNLOADING OF DRY BULK POWDER SHIPMENTS
Filed Oct. 25, 1968  2 Sheets-Sheet 1

INVENTORS
DENNIS S. MILEWSKI
RALPH O. TREAT
BY Elton H. Branch

United States Patent Office 3,512,842
Patented May 19, 1970

3,512,842
METHOD OF SLURRY UNLOADING OF DRY BULK POWDER SHIPMENTS
Dennis S. Milewski and Ralph O. Treat, Havre de Grace, Md., assignors to J. M. Huber Corporation, Locust, N.J., a corporation of New Jersey
Continuation-in-part of application Ser. No. 691,864, Dec. 19, 1967. This application Oct. 25, 1968, Ser. No. 770,864
Int. Cl. B65g 53/04
U.S. Cl. 302—66  10 Claims

ABSTRACT OF THE DISCLOSURE

A method of slurry unloading of dry bulk powder shipments of synthetic, finely divided, precipitated, amorphous sodium alumino silicate pigments having a mean particle diameter in the sub-micron range from hopper cars which includes pumping heated water into the bottom of the hopper car in sufficient quantity to make the desired solids content slurry. A soaking period sufficient to wet out the pigment is provided. The powder-water mixture is then agitated by pumping air into the hopper car through a multiple point air agitation system to disperse the powder in the water. With the air agitation continuing, the slurry is pumped through throttled-down pumps providing high shear to the slurried material in a recycle operation to wet out any powder not yet dispersed. The slurry is then pumped from the car to the final point of use.

CROSS REFERENCE TO RELATED APPLICATION

The present application is a continuation-in-part of copending application Ser. No. 691,864, filed Dec. 19, 1967, now abandoned.

BACKGROUND OF THE INVENTION

In general, the present invention relates to the removal of pulverulent substances from containers and more particularly to the slurry unloading of dry bulk powder shipments.

The present invention specifically deals with the problem of unloading dry bulk shipments of powdered materials from hopper cars at the users plant. In the unloading of powdered material in a dry state many problems such as bridging, packing and the like occur, creating a need for special attention to properly and quickly unload the car.

In the dry powder unloading of hopper cars various methods such as vibrators, hammering by hand and the like have been used to cause the powder to flow through the outlet without bridging or packing.

There are many wet methods of dispersing a powder so as to obtain a homogeneous mixture which may generally be applied to materials of the type referred to herein.

Among the known methods generally applicable and suitable for the slurry unloading of dry bulk powder shipments of materials of the class referred to herein is the method taught by French Pat. No. 677,940 of Dec. 19, 1929 to Ruffier-Meray. According to the teachings of this French patent a mass of the pigment to be dispersed is placed in a closed container, a vacuum is applied to the top of the container and a dispersing liquid is introduced slowly into the bottom of the container so as to rise throughout the mass of the material by capillary action. After the wetting of the mass is complete, the above cited French patent teaches that further mixing may be effected to render the dispersion homogeneous.

Other well known techniques are taught by Reents et al., U.S. Pat. No. 2,605,084 and by Feigin's U.S. Pat. No. 2,827,185.

While the techniques involved in the known methods are to some extent applicable to dry powders such as synthetic, finely divided, precipitated, amorphous sodium alumino silicate pigments having a mean particle diameter in the submicron range and of the class generally defined herein, these materials often present special problems in handling and in adequately wetting out to produce a homogeneous slurry suitable for pumping.

The present invention is directed to providing a solution to the special handling and wetting out problems associated with the materials referred to herein.

In particular the problems of the proper flow rates, water temperature, soak times, means of agitation and the application of suitable shear forces have been at the heart of the difficulties encountered in handling these materials.

SUMMARY OF THE INVENTION

Accordingly, it is an object of the present invention to provide a new, highly effective method which overcomes the deficiencies of the prior art methods as described above.

It is a further object of the present invention to provide a method of producing a substantially homogeneous dispersion suitable for slurry unloading of dry bulk powder shipments of materials of the class defined herein.

Other objects and a fuller understanding of the present invention may be had by referring to the following description and claims taken in conjunction with the accompanying drawings.

The present invention overcomes the deficiencies of the prior art under the conditions indicated above and achieves its objectives by providing for the use of heated water pumped into the bottom of a hopper car containing dry powder, such as a synthetic, finely divided, precipitated, amorphous sodium alumino silicate pigment having a mean particle diameter in the sub-micron range, followed by a soaking period and multi-point air agitation to produce a slurry of the powder which can be effectively pumped. With the air agitation continuing, the slurry is pumped through throttled-down pumps, providing high shear to the slurried material, in a recycle operation to wet out any powder not yet dispersed adequately. The slurry is then pumped from the car to the final point of use. The solids content of the slurry is controlled to the solids content requirements of the end use so that the slurry may be used without further treatment.

BRIEF DESCRIPTION OF THE DRAWINGS

In order to facilitate the understanding of the present invention, reference will now be made to the appended drawings of a preferred embodiment of the present invention. The drawings should not be construed as limiting the invention but are exemplary only. In the drawings.

DESCRIPTION OF THE PREFERRED EMBODIMENTS

Figure 1:
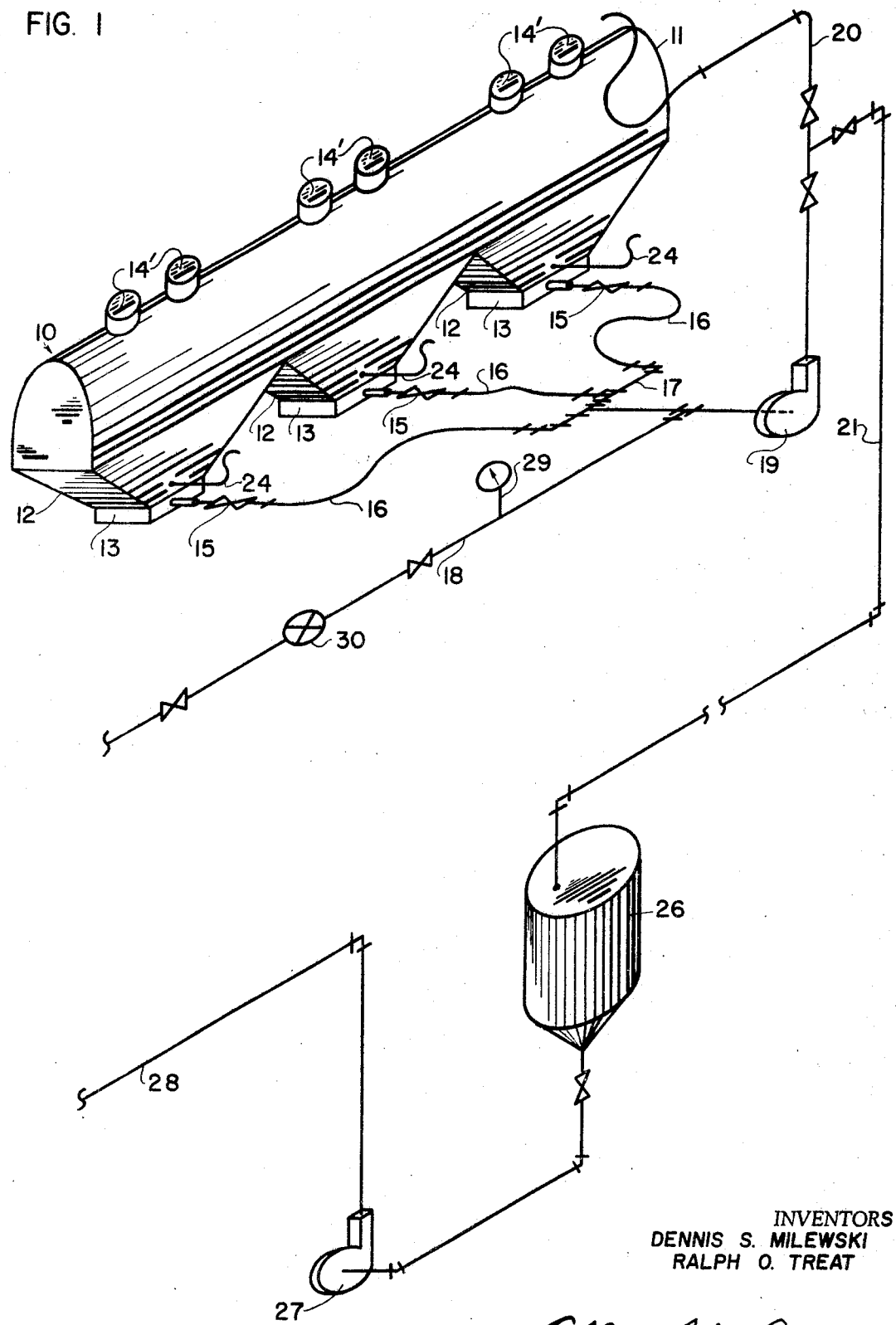
FIG. 1 is a schematic diagram of one system which may be used in practicing the invention.

Referring now to the drawings in detail wherein like reference numerals indicate like parts throughout the several figures, the reference numeral 10 indicates generally a hopper car modified to permit the practice of the invention.

The hopper car 10 has a generally cylindrical body 11 and a plurality of hoppers 12 depending therefrom in spaced relation.

Figure 2:
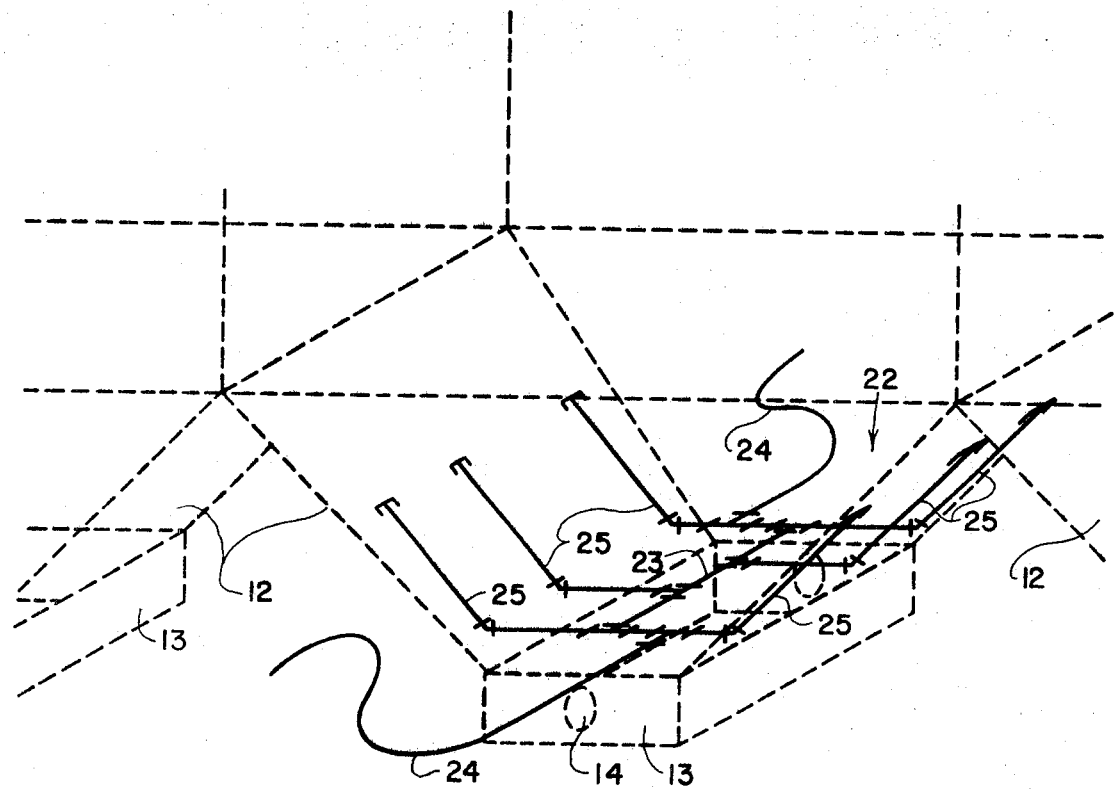
FIG. 2 is a schematic diagram of a pneumatic agitation system which may be used in practicing the invention.
Figure 3:
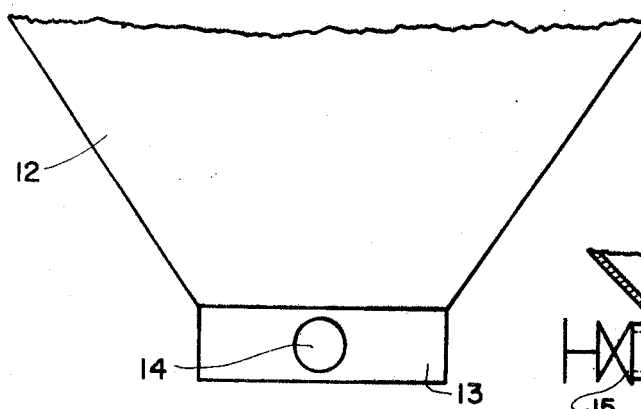
FIG. 3 is a fragmentary side elevation of the lower end of one hopper of a hopper car modified for practicing the invention.

The hoppers 12 have generally rectangular boxes 13 formed on their lower ends as can be seen in FIGS. 1 and 2. Filling domes 14' are mounted on the top of the body 11 to give access to the body 11 as well as to permit filling of the body 11 with dry powdery material. The hopper car 10 described above is one of conventional design although the invention may be practiced in any conventional hopper car modified as described below.

Figure 4:
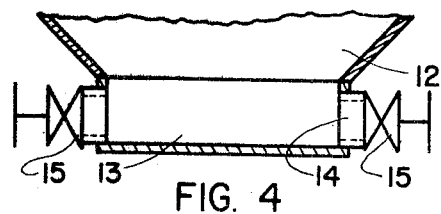
FIG. 4 is a fragmentary vertical cross section taken on line 4—4 of FIG. 3, looking in the direction of the arrows.

A pipe coupling 14 is secured as by welding to opposite sides of the boxes 13 as shown in FIG. 4. A valve 15 is connected to each of the pipe couplings 14 for reasons to be assigned. A flexible conduit 16 is adapted to be secured to each of the valves 15 on one side of the hopper car 10. The conduits 16 extend from a manifold 17 which is fed by a water supply line 18. A pump 19 is connected to the manifold 17 and is adapted to pump slurry through a recycle line 20 or a product line 21 depending on the valve settings.

A pneumatic agitator system is indicated generally by the reference numeral 22 and consists of a manifold pipe 23 having air supply lines 24 connected thereto at opposite ends thereof. The pneumatic agitator system is mounted in the hopper 12 and has air feeder pipes 25 extending upwardly therefrom in spaced relation in the hopper 12. The air feeder pipes 25 are arranged to feed air to spaced positions in the hoppers 12 so that agitation of all of the powder with the water is obtained.

The product line 21 extends to a storage tank 26 which is connected to a pump 27 for pumping the slurry through a pipe 28 to its point of use in the plant.

The water supply line 18 is provided with a temperature gauge 29 and a water meter 30 to measure both the quantity and temperature of the water being fed to the hopper car 10.

The connections for water and air to the hopper car may be made from either side so that the car may be spotted on the unloading track without reference to the side of the car presented to the unloading connections.

While the above described structure of hopper car composed of corrosion resistant or specially lined material is referred to throughout as the preferred embodiment for carrying out the method of the present invention it is clear that many other suitable structural configurations may be utilized when carrying out the present invention.

The class of materials for which the method of the present invention was developed and for which it has particular applicability are synthetic, finely divided, amorphous sodium alumino silicate pigments having a mean particle diameter in the sub-micron range. These materials are more fully described and defined in detail in U.S. Pats. Nos. 2,739,073 and 2,848,346.

The present invention is applicable to materials having like properties, such as particle size, surface area, dispersibility and the like, to those possessed by the materials defined in the above cited U.S. patents. In addition mixtures in varying proportions of these sodium alumino silicate pigments with other pigmentary materials such as kaolin clays, silicic acid pigments, zinc oxide, titanium dioxide, calcium silicates, precipitated calcium carbonates, magnesium silicates and the like are within the contemplation and scope of the present invention, although it should be recognized as varying proportions of other materials than the sodium alumino silicates are added to a given mixture certain of the process controls such as slurry temperature, soak time and the like may become less critical than for slurries of sodium alumino silicate alone.

In operation, an amorphous sodium alumino silicate in white powder form is loaded in a hopper car typically having a capacity of from 3,500 to 6,000 cubic feet at a density of 15 to 17 pounds per cubic foot. The car is initially loaded to full visible capacity. During shipment the sodium alumino silicate will typically settle to a density between 18 and 19 pounds per cubic foot. This settling provides sufficient room for the addition of the necessary water to the hopper car even though initially some of the sodium alumino silicate material will be lifted upward by the addition of the water and a portion of the sodium alumino silicate material may continue to float on the water for some time before becoming a part of the homogeneous dispersion.

Upon arriving at the unloading point, hot water having a temperature between 73° F. and 140° F. will be pumped at a low, controlled rate into the bottom of the sodium alumino silicate. It is preferred that the water have a temperature which is nominally in the range of 125° to 130° F. since a lower temperature requires a longer time to effectively wet out the sodium alumino silicate and since higher temperatures, particularly those above 140° F. give higher viscosities which make air agitation difficult. The water should be added to the bottom of the mass rather than the top because the addition of the water at the top results in the formation of a layer of material which will not effectively allow the air to escape.

The water should be added at a low, controlled rate. The flow rates of the water being pumped into a tank car depend primarily on the density of the slurry required (pounds per gallon) and the amount of the water (gallons) to be added. It is preferred that the water be added at the bottom of the mass at a controlled rate not to exceed 30 gallons per minute per compartment or 90 gallons per minute for a three compartment tank car as shown in FIG. 1. The use of higher rates may cause the sodium alumino silicate to overflow out of the tank car because of flotation and air escapement.

Enough water is added to make up a slurry containing 2.3 to 2.4 pounds of sodium alumino silicate per gallon of slurry. Higher concentrations are difficult to unload.

After sufficient water is added to make up the desired slurry, the mass is allowed to soak for a long enough period so that all of the sodium alumino silicate is wetted since after the initial addition of water there is still some flotation of material on the surface of the slurry and some of the material under the water is still dry. Typically a soaking period of from 8 to 15 hours or what might be called an over-night soak may be utilized. This soaking time reduces the number of small-sized lumps of sodium alumino silicate which are often produced by the initial addition of water.

Generally speaking the sodium alumino silicate material in a slurry form is thixotropic. While at rest the slurried material often becomes jelly-like and requires agitation to become fluid. For in-car slurried sodium alumino silicate material having a temperature range from about 125° to 130° F., typical viscosity measurements are as follows:

| Lbs./gal. | Percent solids | Centipoise |
| --- | --- | --- |
| 2.1 | 21.6 | 8.0 |
| 2.2 | 22.5 | 13.0 |
| 2.3 | 23.5 | 73.0 |
| 2.4 | 24.5 | 109.0 |
| 2.5 | 25.4 | 435.0 |

In the above table lbs./gal. refers to the number of pounds of sodium alumino silicate per gallon of slurry.

A typical product of in-car slurried sodium alumino silicate is in the range from about 2.3 to 2.4 pounds per gallon or from approximately 23% solids to approximately 25% solids with viscosities between 73 and 110 centipoise.

After the soak period, the wetted sodium alumino silicate is dispersed by distributing air throughout the mass for approximately 30 minutes prior to the recycling or pumping out operations. Multiple point air agitation is then continued throughout the recycle and pumping out cycles. It has been found that 3/16 inch holes spaced one foot apart in 1/2 inch pipe in the configuration indicated by 22 in FIG. 2 will do an effective job of dispersing sodium alumino silicate using an air pressure of 80 to 100 pounds per square inch (gage). In general, the more holes employed and the greater the flow of air, the better the dispersion. Multiple point air agitation helps to prevent settling of the sodium alumino silicate pigment particles and generally allows a good dispersion of the slurried sodium alumino silicate up to approximately 25% solids.

Further, after the soaking period, the sodium alumino silicate is often found to be jelly-like in the bottom two-thirds of the hopper car. The air agitation does only a limited amount of agitation in this area because it is compressed on the bottom of the hopper, but it expands as it rises and causes large splashes at the top of the slurry. As the level drops, this splashing aids in mixing the jelly-like material that is clinging to the walls and the slope sheets. The spread out agitator system indicated generally at 22 permits these splashes to be nearer to the walls and thus more effective.

Since it is desirable to have this splashing at the level at which the clinging jelly-like material is sliding down the walls, a slow, controlled pump out in conjunction with the pneumatic system shown allows the splashing caused by the air agitation to help move the mass downward and directly over the air ports where it is reslurried and dispersed.

After a period of multiple point air agitation, a recycle operation is begun to wet out any sodium alumino silicate not yet dispersed in the water. This recycle operation serves to wet out any material which might still be floating and to slurry any masses of material not yet agitated by the multi-point air agitation.

This recycling operation passes material in slurried form through a high capacity pump which has had its discharge throttled down by 70 to 90%. For example, a 600 gallon per minute pump throttled down to 125 gallons per minute has been found satisfactory to reduce the firm, small-sized lumps or residue which may be present by working on the material through high shear. By use of this means of providing high shear to the slurried material, a residue of from 3 to 5% retained on an 80 mesh screen may be reduced to 1% or less on the same screen after shear.

The pump may remain in a throttled condition both throughout recycle and pump out to provide additional high shear on the slurried material.

After a period of recycling and with air agitation and recycling continuing, the slurry may be pumped out of each compartment at a controlled rate of, for example, 30 to 40 gallons per minute per compartment, to provide a nominal output of from 100 to 120 gallons per minute from all three compartments of the tank car.

The following examples illustrate the method of practicing the invention.

Example 1

A hopper car equipped as illustrated in the specification and drawings had its center compartment filled with 18,600 pounds of an amorphous sodium alumino silicate in white powder form and was shipped to an unloading point in 17 days of transit. Water, at a rate of 25 g.p.m. and a temperature of 130° F., was pumped through the pipe coupling into the bottom of the hopper containing the sodium alumino silicate. A total of 4,125 gallons of water was added to the sodium alumino silicate in the hopper. Following an over-night soaking period of 12 hours, air under 100 p.s.i.g. was fed through pneumatic agitator pipes and simultaneously the slurry was recycled through the pump and recycle line for a period of 20 minutes at which time pump out was started, continuing with air agitation and recycle. Pump out was completed in 3½ hours with the compartment 100% empty.

Example 2

Example 1 was repeated using water at temperatures of 58° F., 62° F., 73° F., 82° F., 100° F., 120° F., 125° F., 140° F., 148° F., 160° F., 166° F., and 180° F. The results of these tests show that cold water does not wet out the powder and hence does not form a slurry. Water from 73° F. to 140° F. gives increasingly better wet out results as the temperature increases with higher temperatures not giving much improved results over the 140° F. temperature.

The type of powder being shipped may require minor adjustments in the water-powder ratio and water temperatures but these may be easily determined by following the teachings of the invention.

Other powders in addition to sodium alumino silicates which have been unloaded by the method described above are silicic acid pigments, zinc oxide, kaolin clays, titanium dioxide, calcium silicates, precipitated calcium carbonates, magnesium silicates and the like. However, the slurry unloading of none of the above listed materials requires quite the same close control of conditions such as temperature, flow rates, soak times and the like as is required for the slurry unloading of sodium alumino silicates. For example, several of the above listed materials, such as titanium dioxide, require little or no soak time and are operable with water at ambient temperatures. This observation is of course in no way intended to foreclose the use of the present invention for handling any of the materials referred to but is merely made as an indication of the initial nature of the conditions described for successful commercial unloading of sodium alumino silicates of the type defined herein.

The method of the present invention may be applied entirely under atmospheric conditions or following the application of a vacuum as taught in the above cited French patent.

While the invention has been described with reference to its preferred embodiments, it will be understood by those skilled in the art that various changes may be made and equivalents may be substituted for steps and elements thereof without departing from the true spirit and scope of the invention. In addition, many modifications may be made to adapt a particular situation or material to the teachings of the invention without departing from its essential teachings.

What is claimed is:

1. A method of unloading dry bulk powder hopper car shipments comprising:
   (a) pumping water at a temperature of at least 73° F. into the lower portion of the dry bulk powder shipment in a quantity sufficient to produce a slurry of predetermined solids content,
   (b) providing a soaking period to wet out the powder,
   (c) the powder is then slurried in the water by air agitation from air supplied under pressure to multiple points in the lower portion of the dry bulk shipment, and
   (d) the powder-water slurry is pumped from the lower portion of the hopper car.

2. A method as set forth in claim 1 in which the dry bulk powder is a synthetic, finely divided, precipitated, amorphous sodium alumino silicate pigment having a mean particle diameter in the sub-micron range.

3. A method as set forth in claim 2 in which the water temperature is between 73° F. and 140° F.

4. A method as set forth in claim 3 in which the step of pumping water at a temperature between 73° F. and 140° F. into the lower portion of the dry bulk powder shipment of a synthetic, finely divided, precipitated, amorphous sodium alumino silicate pigment having a mean particle diameter in the sub-micron range in a quantity sufficient to produce a slurry of predetermined solids content is followed by a soaking period of sufficient duration to wet out the pigment.

5. A method as set forth in claim 4 in which the soaking period is longer than 8 hours.

6. A method as set forth in claim 4 in which the powder-water slurry is pumped from the lower portion of the hopper car in a recycle back to the top of the hopper car prior to pumping the slurry from the hopper car.

7. A method as set forth in claim 6 in which the multiple point air agitation is continued through the recycle and pump out of the hopper car.

8. A method as set forth in claim 7 in which high shear is applied to the slurried material by pumping it through throttled-down pumps during the recycle and pump out of the hopper car.

9. A method as set forth in claim 8 in which the pumping of the water into the lower portion of the dry bulk powder is at a controlled rate not to exceed 30 gallons per minute per compartment of the hopper car.

10. A method as set forth in claim 9 in which the powder-water slurry is pumped from the hopper car at a rate not exceeding 40 gallons per minute per compartment.

References Cited

UNITED STATES PATENTS

| | | | |
|---|---|---|---|
| 3,378,387 | 4/1968 | Du Bois | 106—309 |
| 2,605,084 | 7/1952 | Reents et al. | 259—1 |
| 2,827,185 | 3/1958 | Feigin | 214—83.28 |
| 3,316,023 | 4/1967 | Koranda | 302—16 |
| 3,382,011 | 5/1968 | Mascarelo et al. | 302—14 |

ANDRES H. NIELSEN, Primary Examiner

U.S. Cl. X.R.

302—14